US010599175B1

(12) United States Patent
Wells et al.

(10) Patent No.: US 10,599,175 B1
(45) Date of Patent: Mar. 24, 2020

(54) TIME SYNCHRONIZED FREQUENCY AND VOLTAGE REGULATION OF ELECTRIC POWER BALANCING AREAS

(71) Applicant: PXiSE Energy Solutions, LLC, San Diego, CA (US)

(72) Inventors: Charles H. Wells, San Diego, CA (US); Raymond A. de Callafon, San Diego, CA (US); Patrick T. Lee, San Diego, CA (US)

(73) Assignee: PXiSE Energy Solutions, LLC, San Diego, CA (US)

( * ) Notice: Subject to any disclaimer, the term of this patent is extended or adjusted under 35 U.S.C. 154(b) by 183 days.

(21) Appl. No.: 15/904,120

(22) Filed: Feb. 23, 2018

Related U.S. Application Data (63) Continuation-in-part of application No. 15/607,076, filed on May 26, 2017.
(Continued)

(51) Int. Cl.
  *G05F 1/66*  (2006.01)
  *H02J 3/16*  (2006.01)
  *H02M 1/00*  (2006.01)

(52) U.S. Cl.
  CPC .............. *G05F 1/66* (2013.01); *H02J 3/16* (2013.01); *H02M 1/00* (2013.01); *H02M 2001/0012* (2013.01)

(58) Field of Classification Search
  CPC ..... G05F 1/66; H02J 3/12; H02J 3/16; H02M 1/00; H02M 2001/0003; H02M 2001/0012
(Continued)

(56) References Cited

U.S. PATENT DOCUMENTS 6,819,087 B2  11/2004 Delmerico et al.
6,985,800 B2   1/2006 Rehtanz et al.
(Continued)

FOREIGN PATENT DOCUMENTS

CN   102185326 A    9/2011
CN   102707628 A   10/2012
(Continued)

OTHER PUBLICATIONS

Patent Cooperation Treaty, International Search Report for PCT/US2017/034765, dated Oct. 9, 2017.
(Continued)

Primary Examiner — Hal Kaplan
(74) Attorney, Agent, or Firm — Jones Day (57) ABSTRACT

Systems, methods, and computer program products are described for controlling power of a balancing area having a plurality of distributed energy resources of a power system. A high frequency controller having a memory and at least one data processor of one distributed energy resource of the balancing area continuously receives (i) data including a phasor data stream having time-synchronized phasor measurements derived from the plurality of distributed energy resources of the balancing area and (ii) real-time energy levels of the plurality of distributed energy resources. The high frequency controller determines a power set point pair having a desired frequency set point and a desired voltage set point based on a combination of the real-time energy levels and the time-synchronized phasor measurements. The high frequency controller continuously dispatches the power set point pair to the plurality of distributed energy resources to enable control and/or monitoring of a frequency component of the phasor data stream.

23 Claims, 5 Drawing Sheets

Related U.S. Application Data (60) Provisional application No. 62/465,065, filed on Feb. 28, 2017.

(58) Field of Classification Search
USPC .......................................................... 307/24
See application file for complete search history.

(56) References Cited

U.S. PATENT DOCUMENTS

| | | |
|---|---|---|
| 7,096,175 B2 | 8/2006 | Rehtanz et al. |
| 7,274,975 B2 | 9/2007 | Miller |
| 7,490,013 B2 | 2/2009 | Wells |
| 7,498,821 B2 | 3/2009 | Wells |
| 7,710,729 B2 | 5/2010 | Li et al. |
| 7,755,371 B2 | 7/2010 | Wells |
| 7,961,112 B2 | 6/2011 | Wells |
| 7,987,059 B2 | 7/2011 | Gong et al. |
| 8,022,575 B2 | 9/2011 | Korba et al. |
| 8,457,912 B1 | 6/2013 | Wells |
| 8,498,752 B2 | 7/2013 | Wells |
| 8,532,230 B2 | 9/2013 | Taft |
| 8,659,186 B2 | 2/2014 | Teichmann et al. |
| 8,738,191 B2 | 5/2014 | Aivaliotis et al. |
| 8,892,375 B2 | 11/2014 | Taft |
| 8,907,615 B2 | 12/2014 | Mills-Price et al. |
| 8,942,856 B2 | 1/2015 | Ren et al. |
| 9,037,425 B2 | 5/2015 | Yang et al. |
| 9,043,037 B2 | 5/2015 | Bhageria et al. |
| 9,166,500 B2 | 10/2015 | Wu et al. |
| 9,230,429 B2 | 1/2016 | McKinley et al. |
| 9,411,389 B2 | 8/2016 | Shi et al. |
| 9,444,257 B2 | 9/2016 | Wells |
| 9,496,715 B2 | 11/2016 | Wilson |
| 9,507,367 B2 | 11/2016 | Venayagamoorthy et al. |
| 9,588,156 B2 | 3/2017 | Glavic et al. |
| 9,634,850 B2 | 4/2017 | Taft et al. |
| 2008/0071482 A1 | 3/2008 | Zweigle et al. |
| 2009/0319090 A1 | 12/2009 | Dillon et al. |
| 2011/0276194 A1 | 11/2011 | Emalfarb et al. |
| 2013/0043690 A1 | 2/2013 | Wilson et al. |
| 2013/0073108 A1 | 3/2013 | Kolwalkar |
| 2013/0073109 A1 | 3/2013 | Cheng et al. |
| 2013/0218494 A1 | 8/2013 | Chiang et al. |
| 2013/0262012 A1 | 10/2013 | O'Sullivan et al. |
| 2014/0070617 A1 | 3/2014 | Detmers et al. |
| 2014/0074306 A1 | 3/2014 | Lu et al. |
| 2014/0074311 A1 | 3/2014 | Kearns et al. |
| 2014/0100705 A1 | 4/2014 | Shi et al. |
| 2014/0159658 A1 | 6/2014 | Kiceniuk et al. |
| 2014/0244065 A1 | 8/2014 | Biswas et al. |
| 2014/0277599 A1 | 9/2014 | Pande et al. |
| 2014/0306534 A1 | 10/2014 | Shi et al. |
| 2014/0307494 A1 | 10/2014 | Wu et al. |
| 2015/0005967 A1 | 1/2015 | Jóhannsson et al. |
| 2015/0006141 A1 | 1/2015 | Enenkel et al. |
| 2015/0051852 A1 | 2/2015 | Pan et al. |
| 2015/0051856 A1 | 2/2015 | Chu et al. |
| 2015/0073735 A1 | 3/2015 | Abido et al. |
| 2015/0100282 A1 | 4/2015 | Shokooh et al. |
| 2015/0326160 A1 | 11/2015 | Diez-Maroto et al. |
| 2016/0003879 A1 | 1/2016 | Wilson et al. |
| 2016/0091537 A1 | 3/2016 | Gaarder et al. |
| 2016/0118878 A1 | 4/2016 | Alteneiji |
| 2016/0179120 A1 | 6/2016 | Boardman et al. |
| 2016/0198245 A1 | 7/2016 | Rhoads et al. |
| 2016/0241035 A1 | 8/2016 | Shi et al. |
| 2016/0266559 A1 | 9/2016 | Shi et al. |
| 2016/0299187 A1 | 10/2016 | Liang et al. |
| 2016/0313197 A1 | 10/2016 | Acharya et al. |
| 2016/0320435 A1 | 11/2016 | Budhraja et al. |
| 2016/0329700 A1 | 11/2016 | O'Brien et al. |
| 2016/0329709 A1 | 11/2016 | Park et al. |
| 2016/0334447 A1 | 11/2016 | Parashar et al. |
| 2017/0012468 A1 | 1/2017 | Park |
| 2017/0017298 A1 | 1/2017 | Biswas et al. |
| 2017/0104366 A1 | 4/2017 | Münz |
| 2017/0109524 A1 | 4/2017 | Kolacinski et al. |
| 2017/0346286 A1 | 11/2017 | Wells et al. |
| 2017/0346291 A1 | 11/2017 | Wells et al. |

FOREIGN PATENT DOCUMENTS

| | | |
|---|---|---|
| CN | 203166515 U | 8/2013 |
| CN | 103414245 A | 11/2013 |
| CN | 103474992 A | 12/2013 |
| CN | 103632313 A | 3/2014 |
| CN | 104242462 A | 12/2014 |
| CN | 104297632 A | 1/2015 |
| CN | 104865474 A | 8/2015 |
| CN | 105224811 A | 1/2016 |
| CN | 105375484 A | 3/2016 |
| CN | 105529704 A | 4/2016 |
| CN | 106383287 A | 2/2017 |
| CN | 106443246 A | 2/2017 |
| EP | 1 830 447 A1 | 9/2007 |
| EP | 1 919 076 A2 | 5/2008 |
| EP | 2 182 207 A2 | 5/2010 |
| KR | 20160038927 A | 4/2016 |
| WO | WO 2011/150247 A1 | 12/2011 |
| WO | WO 2014/061889 A1 | 4/2014 |
| WO | WO 2017/210124 | 12/2017 |

OTHER PUBLICATIONS

Patent Cooperation Treaty, Written Opinion of the International Searching Authority for PCT/US2017/034765, dated Oct. 9, 2017.

TIME SYNCHRONIZED FREQUENCY AND VOLTAGE REGULATION OF ELECTRIC POWER BALANCING AREAS

CROSS REFERENCE TO RELATED APPLICATIONS

This application claims priority to U.S. Application No. 62/465,065, titled "Time Synchronized Frequency and Voltage Regulation of Electric Power Balancing Areas," filed Feb. 28, 2017, and is a continuation-in-part of U.S. application Ser. No. 15/607,076, titled "Decoupling Synchrophasor Based Control System for Distributed Energy Resources," filed May 26, 2017.

TECHNICAL FIELD

The subject matter described herein relates to achieving and/or maintaining stability of electric power balancing areas.

BACKGROUND

Electric power generation is the conversion of energy produced by non-renewable and/or renewable energy resources. Generated electric power can be distributed to consumers and/or loads for consumption over an alternating current (AC) electrical power grid. To maintain a balance between power consumption and generation of an electrical power grid, one or more electrical power balancing areas (BAs) can be defined. For example, the one or more electrical power BAs are pre-defined areas within which power generation, transmission, and/or electrical loads are balanced. Balancing between the power consumption and generation is critical to avoid unreliable power. Such unreliability can lead to instability of the power grid, and in extreme cases, cause power outages. Droop control is a conventional control algorithm which reacts when the frequency or magnitude of an AC voltage droops or deviates from a nominal set point power level. Drooping reactively adjusts the real or reactive power output in an effort to modify the power flow to achieve the nominal set point power level. Droop control is also designed to address stability of a grid having non-renewable DERs having large spinning inertia directly related to the frequency of the voltage being generated.

SUMMARY

In one aspect, a method for controlling power of a balancing area having a plurality of distributed energy resources of a power system includes continuously receiving, by a high frequency controller having a memory and at least one data processor of one distributed energy resource of the balancing area, data including a phasor data stream having time-synchronized phasor measurements derived from the plurality of distributed energy resources of the balancing area. The high frequency controller also continuously receives real-time energy levels of the plurality of distributed energy resources. A power set point pair is determined by the high frequency controller. The power set point pair has a desired frequency set point and a desired voltage set point based on a combination of the real-time energy levels and the time-synchronized phasor measurements. The high frequency controller continuously dispatches the power set point pair to the plurality of distributed energy resources to enable control and/or monitoring of a frequency component of the phasor data stream.

In some variations, a phasor output of at least one of the plurality of distributed energy resources can be maintained based on the dispatched power set point pair. The phasor output can have a constant frequency approximately equal to a nominal frequency set point of the at least one distributed energy resource. The phasor output can have a constant voltage magnitude equal to a nominal magnitude set point of the at least one distributed energy resource. The phasor output can have a constant voltage angle.

In other variations, a sign of the constant voltage angle can be determined based on the real-time energy levels and real-time storage capabilities of at least one energy storage device of the distributed energy resource.

In some variations, periodic disturbances can be dampened in a frequency of the phasor output or a voltage angle of the phasor output.

In other variations, the plurality of distributed energy resources can include at least one of a photovoltaic cell, a battery, a fuel cell, a wind turbine, a combined cycle gas turbine, a sterling engine, an energy storage system, or a generator.

In some variations, the phasor data stream can be continuously received from at least one phasor measurement unit. In other variations, the phasor data stream can be continuously received from an instrument capable of sampling and/or supplying at least one phasor measurement.

In other variations, the desired frequency set point can be defined by $f(kT_s)=D(q)\beta(kT_s)$, wherein $f(kT_s)$ is a filtered derivative of discrete-time samples, $\beta$ is a voltage angle, $T_s$ is a discrete-time sampling time, q is a time shift operator, $D(q)$ is a discrete time filter, and k is a number of discrete samples The subject matter described herein provides many technical advantages. For example, the current subject matter provides for an alternative method of stabilizing and/or controlling of power flow within the power grid without using droop control. The subject matter described herein is a proactive approach that controls a partial state of an electrical power BA. Such control can be achieved by using high speed time-synchronized phasor measurements of frequency and voltage distributed throughout the electrical power BAs in connection with the hierarchical coordinated control algorithms as described herein. Use of the subject matter herein also can provide the ability to regulate the power generation of mixed BAs having both renewable and non-renewable DERs.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

An electric power system (EPS) can be made up of, for example, one or more distributed energy resources (DERs) which include renewable and/or non-renewable energy resources. Traditionally, EPSs were made up of non-renewable DERs such as combined cycle gas turbines, sterling engines, diesel generators, or thermal energy sources that can generate power using, for example, gasoline, oil or natural gas and other combustible material (e.g., garbage, bagasse or other organic material). Renewable energy resources such photovoltaic cells, fuel cells, wind turbines, and/or hydroelectric dams have increasingly been added to EPSs to meet increasing power demands. Renewable DERs can operate with high spinning inertia causing faster frequency operation than the non-renewable DERs. DERs can also include batteries, fly wheels, pumped hydro, or other energy storage systems such as electric vehicle charging systems and networks that have the ability to store or produce electric energy. The combination of renewable and non-renewable DERs in a BA can result in intermittent power generation and/or inefficient power generation (e.g., excess power not used by or stored by the EPS) by one or more DERs that does not account for available storage within the EPS.

Unreliability within the EPS can cause the power system to be unstable, and in extreme cases cause temporary and/or permanent power loss. In order to address such instability within a mixed BA, frequency and/or voltage magnitude components of a phasor data stream be stabilized using time synchronized voltage phasors coupled with hierarchal control algorithms.

Figure 1:
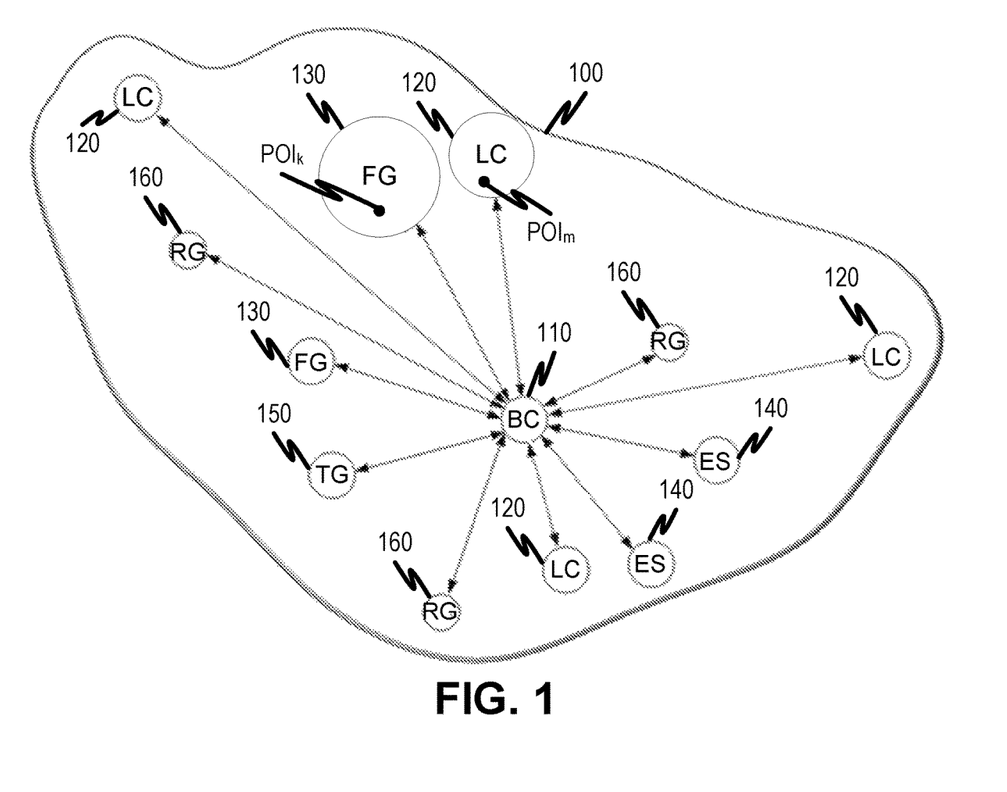
FIG. 1 is a logic diagram illustrating a mixed BA having a centralized balancing controller and a plurality of renewable and non-renewable distributed energy resources.

FIG. 1 is a logic diagram illustrating a mixed BA 100 having a centralized balancing controller (BC) 110 and a plurality of renewable and non-renewable DERs. In an effort to simplify FIG. 1, the electrical connections between the centralized BC 110 and the plurality of renewable and non-renewable DERs are not illustrated. In one example, the plurality of renewable and non-renewable DERs, as illustrated in FIG. 1, can include one or more load centers (LCs) 120, one or more fossil generators (FGs) 130, one or more energy storage (ESs) devices 140, one or more thermal generators (TGs) 150, and one or more renewable generators (RGs) 160. Mixed BAs can also include a wide variety of DERs not illustrated in FIG. 1 such as photovoltaic cells, fuel cells, wind turbines, combined cycle gas turbines, and/or sterling engines. The centralized BC 110 transmits and receives power flow data between the plurality of renewable and non-renewable DERs. The one or more LCs 120 can include one or more controllable loads that consume power. Each of the renewable and non-renewable DERs can include an electrical point of interconnection (POI). At each POI, phasor data streams pertaining the respective DER can be measured. The phasor data stream can include, for example, frequency, angle, and/or magnitude measurements of the AC voltage generated by a respective DER. In some variations, a phasor data stream can be continuously provided by at least one phasor measurement unit (PMU). A PMU is a device which can measure electric properties of a power system. The PMUs can either be co-located or non-co-located with respective DERs. In other variations, the phasor data stream can be continuously provided by an instrument capable of sampling and/or supplying at least one phasor measurement.

The electric behavior at a POI in a single phase or a balanced phase (e.g., positive sequence) AC electric power system can be characterized by voltage as a function of time, v(t), and expressed by:

$$v(t) = V \sin(2\pi f t + \beta) \quad (1)$$

where V is the AC voltage root mean square (RMS) value or magnitude value, $\beta$ is a voltage angle, f is a fundamental AC frequency measured in Hz, and t represents time in seconds. The notion of RMS or magnitude value will be used interchangeably in the following as both are related via mathematical scaling properties. A voltage phasor can be represented by:

$$\vec{v} = (V, \beta) \quad (2)$$

or by the complex vector representation:

$$\vec{v} = V e^{j\beta}, \quad (3)$$

where j is a complex number and follows the relationship expressed by:

$$j^2 = -1. \quad (4)$$

Equation (2) can also be expressed to vary with time by:

$$\vec{v}(t) = V(t) e^{j\beta(t)}. \quad (5)$$

Equation (1) can be expressed as a function of time which results in the expression:

$$\vec{v}(t) = V(t) \sin(2\pi f t + \beta(t)) \quad (6)$$

where f is a fixed AC frequency, e.g. 60 Hz, and the time varying frequency, f(t), of the voltage signal, v(t), can be defined by:

$$f(t) = \frac{1}{2\pi} \frac{d}{dt}(2\pi f t + \beta(t)) = f + \frac{1}{2\pi} \frac{d}{dt} \beta(t). \quad (7)$$

Equation 7 results in the determination of phasor frequency at a POI.

The derivation expressed in Equation (7) can also be performed in a discrete-time domain by formulating an appropriate discrete-time filter, D(q), that computes a filtered derivative of the discrete-time samples, $f(kT_s)$, according to the following expression:

$$f(kT_s) = D(q)\beta(kT_s) \quad (8)$$

where $T_s$ is the discrete-time sampling time, q refers to the time shift operator, and k is a number of discrete samples. The time shift operator, q, can be expressed by:

$$q\beta(kT_s) = \beta((k+1)T_s) \quad (9)$$

and can be of the format expressed by:

$$D(q) = \frac{q-1}{q} F(q) \quad (10)$$

where the filter, F(q), can be used for additional low pass filtering of the voltage angle, $\beta(kT_s)$, to compute the filtered derivative of discrete-time samples, $f(kT_s)$.

PMUs, as provided herein, can have a common time source which provides for time synchronized phasor data streams by temporally matching each component of a phasor data stream. A discrete-time measurement of a time varying phasor can be obtained by a PMU at a POI and expressed by:

$$\vec{v}(kT_s) = V(kT_s)e^{j\beta(kT_s)} \tag{11}$$

for $$t = kT_s \tag{12}$$

where $$k = 0, 1, 2, \ldots \tag{13}$$

With the measurement of a time varying phasor, $\vec{v}(kT_s)$, as defined in Equation (11), a PMU can constrain or wrap the time varying, $\beta(kT_s)$, voltage phase angle between −180 and 180 degrees. In order to compute the time varying frequency, $f(kT_s)$, of the voltage AC signal as in Equation (8), the time varying, $\beta(kT_s)$, voltage phase angle is unwrapped so as to avoid sudden jumps in the time varying, $\beta(kT_s)$, voltage phase angle when it is wrapped between 180 and −180 degrees.

The voltage phasor, $\vec{v}(kT_s)$, as defined in Equation (11) at different POIs in the mixed BA 100 can be used to control and/or monitor the power flow between those different POIs or DERs at those POIs in the mixed BA 100. For example, consider $POI_k$ and $POI_m$ in mixed BA 100. Assuming that the impedance between $POI_k$ and $POI_m$ is given by the impedance, $Z_{k,m}$, and a linear impedance between $POI_k$ and $POI_m$, the impedance, $Z_{k,m}$, can be represented by:

$$Z_{k,m} = |Z_{k,m}|e^{j\theta} \tag{14}$$

where $|Z_{k,m}|$ is the magnitude of the impedance $Z_{k,m}$ between two $POI_k$ and $POI_m$, $\theta$ is the phase angle of the impedance, $Z_{k,m}$, and j is the imaginary number defined in Equation (4). The real power component, P, and reactive power component, Q, flowing through the known impedance $Z_{k,m}$ from $POI_k$ and $POI_m$ can be computed respectively by:

$$P = \frac{V_k V_k}{2|Z_{k,m}|}\cos(\theta) - \frac{V_k V_m}{2|Z_{k,m}|}\cos(\theta - \delta) \tag{15}$$

and $$Q = \frac{V_k V_k}{2|Z_{k,m}|}\sin(\theta) - \frac{V_k V_k}{2|Z_{k,m}|}\sin(\theta - \delta) \tag{16}$$

where $V_k$ and $V_m$ are the voltage RMS or (scaled) magnitude values respectively at $POI_k$ and $POI_m$ and where $\delta$ is the difference between voltage angles of $POI_k$ and $POI_m$ as expressed by:

$$\delta = \beta_m - \beta_k. \tag{17}$$

In the voltage angle difference of Equation (17), $\beta_m$ refers to the voltage phase angle at $POI_m$ and $\beta_k$ refers to the voltage phase angle at $POI_k$.

The result in Equation 15 and Equation 16 indicates that the direction (or sign) and magnitude of the real power flow, P, and the direction and magnitude of the reactive power flow, Q, between two POI locations $POI_k$ and $POI_m$. The result of Equation (15) and Equation (16) can be influenced by controlling the voltage angle difference Equation (17) and the voltage RMS difference between $V_k$ and $V_m$. With measurements of the time varying voltage angle $\beta_k(kT_s)$ and $\beta_m(kT_s)$, the relation between the filtered derivative of the discrete-time samples at $POI_k$ can be given by:

$$f_k(kT_s) = D(q)\beta_k(kT_s) \tag{18}$$

and at $POI_m$ can be given by:

$$f_m(kT_s) = D(q)\beta_m(kT_s) \tag{19}$$

A centralized BC 110 for the mixed BA 100 of FIG. 1 can be used to dispatch a power set point pair. The centralized BC 110 can determine a power set point pair having a desired frequency set point and a desired voltage set point so as to modify the results of Equation (15) and Equation (16). For example, the power set point pair continually dispatched to $POI_m$ can include a desired frequency set point, $f_k(kT_s)$, or angle set point, $\beta_k(kT_s)$, via Equation (18), and a desired voltage set point, $V_k(kT_s)$. Similarly, the power set point pair continually dispatched to $POI_m$ can include a desired frequency set point, $f_m(kT_s)$, or angle set point $\beta_m(kT_s)$ via Equation (18) and a desired voltage set point, $V_m(kT_s)$. The choice for the specific set point values for the voltage amplitude $V_k(kT_s)$, voltage angle $\beta_k(kT_s)$, voltage amplitude $V_m(kT_s)$ and voltage angle $\beta_m(kT_s)$ can be based on an optimal power flow calculation. Controlling the direction and magnitude of the real power flow component, P, and the reactive power flow component, Q, between two POI locations $POI_k$ and $POI_m$ in a mixed BA 100 according to Equation 15 and Equation 16, can also be generalized to multiple POI locations in a mixed BA 100.

Controlling the direction, frequency, and/or magnitude of the real power flow component, P, between any of the POI locations in a mixed BA 100 of FIG. 1 can allow one or more DERs to be controlled within the limits of the available energy storage or available power supply of each DER. In other words, the control can account for the available storage in the mixed BA 100 as a whole rather than based on individual DER capabilities. The phasor data stream representing the energy levels of the one or more DERs can be used to control the real power flow component, P, between any of the POI locations in a mixed BA 100 of FIG. 1. The phasor data stream can include the state of charge in percentage or state of energy in watt-hours of an energy storage system with each DER. In other variations, the energy levels of the one or more DERs in the mixed BA 100 can refer to the available fuel of a fossil or thermal DER.

Figure 2:
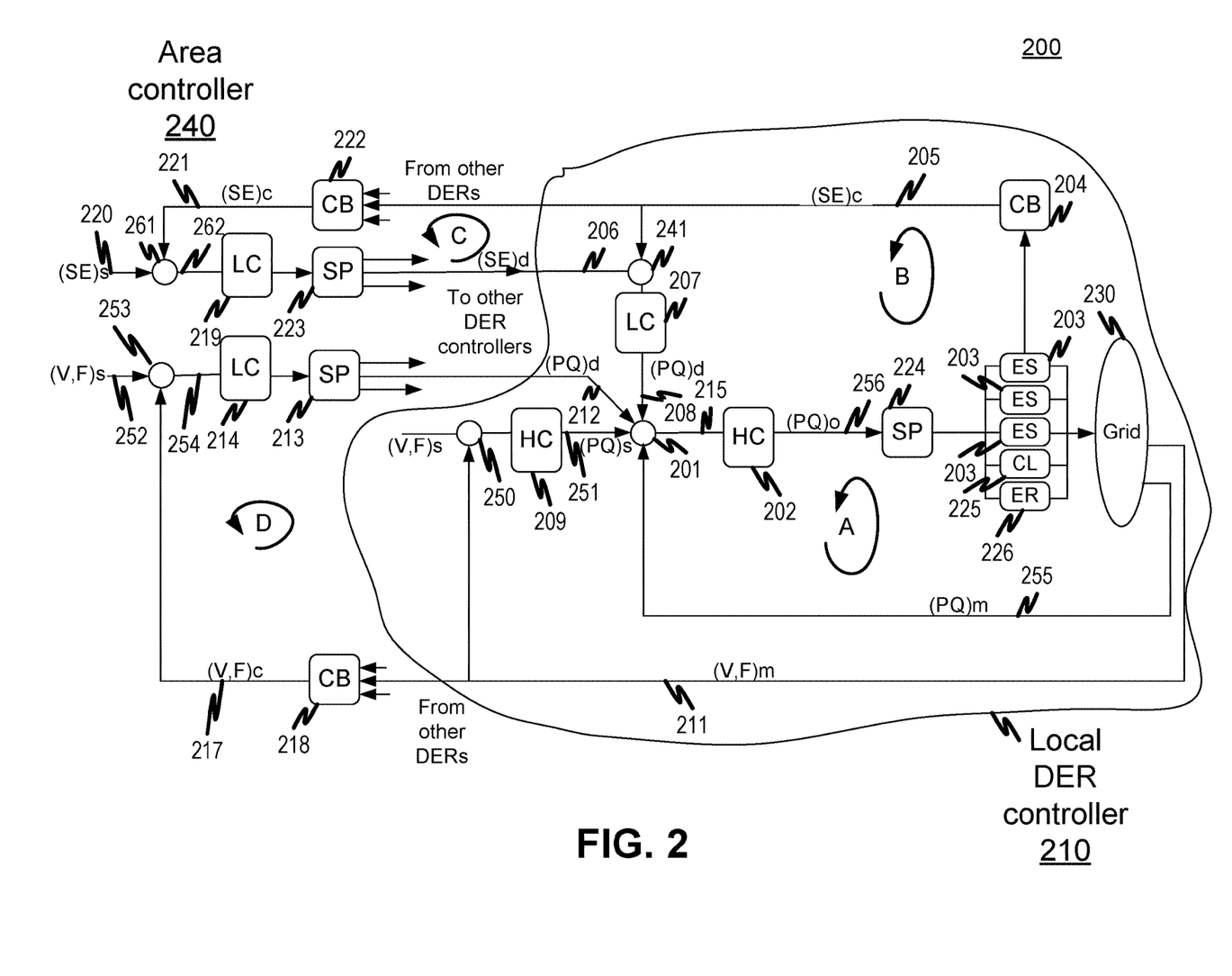
FIG. 2 is a block diagram illustrating hierarchical control algorithms that generate and dispatch a power set point pair to enable control and/or monitoring of a frequency component of the phasor data stream.

FIG. 2 is a block diagram illustrating hierarchical control algorithms 200 for generating and dispatching a power set point pair to enable control and/or monitoring of a frequency component of the phasor data stream. The power set point pair can include a desired frequency set point component and a desired voltage set point component. Each of the one or more DERs in the mixed BA has at least one controller. The controllers of the one or more DERs can collectively coordinate in an effort to enable control of the power flow frequency and voltage components of the mixed BA 100. Individual conflicting actions between the one or more controllers such as those caused by droop control can be avoided due to the power set point pairs being time-synchronized. Each of the one or more DERs can have a "local set point" that contributes to a total "balancing area set point" for frequency and voltage control, as described in more detail below.

Each of the one or more DERs can have a nominal voltage set point and a nominal frequency set point such as a nominal voltage transmission or distribution level (e.g., 480V, 12 kV, 69 kV, 230 Kv) or a nominal frequency level (e.g., 60 Hz). The nominal voltage and frequency set points can be modified by supervisory controller of a local DER (e.g., high frequency controller 202). Having one or more local power set points that contribute to a total area power set point can provide for multi-level hierarchical voltage and frequency of the power flow within a mixed BA 100: one at the DER level (the local DER controller 210) and a second level of control at the area level (the area controller 240).

The hierarchal control algorithms 200 can incorporate a local DER controller 210 and an area controller 240 to create a two-level cascade controller. Each DER of the mixed BA 100 can include a single input/output controller (e.g., low frequency controller 207), a real and reactive power controller (e.g., high frequency controller 202), and a voltage-frequency controller that controls frequency and voltage of the DER (e.g., low frequency controller 214). Low frequency controller 207 can control the stored energy of a local DER. High frequency controller 202 can control the real and reactive power at a POI of a local DER (e.g., $POI_k$, $POI_m$).

The local DER controller 210 can include at least two high frequency controllers HC 202, 209, a low frequency controller LC 207, a combiner CB 204, a splitter SP 224, energy storage devices ES 203, controllable loads CL 225, summation block 208, and energy resources 226. High frequency controllers HC 202, 209 can be for example controllers which operate at a frequency of at least approximately 60 Hz or greater. Low frequency controller LC 207 can be, for example, a controller that operates at a frequency of no more than approximately 1 Hz. Area controller 240 can include at least two low frequency controllers 214, 219, at least two splitters SP 213, 223, and at least two combiners 218, 222. Splitters SP 213, 223, 224 can receive a single data stream, (PQ)o, 256, and output multiple data streams to one or more devices. For example, splitters SP 213, 223, 224 can partition the commanded set point pairs to each local DER. The splitters SP 213, 223, 224 can take into account local DER dynamic response characteristics and/or the local DER energy capacity, along with the impedance and relative impact on area frequency and voltage to determine power set point pairs. Combiners 204, 218, 222 receive multiple data streams and output a single, combined data stream.

Control loop A of FIG. 2 can maintain the stored energy of the DER by means of control loop B by accounting for the output 208 of low frequency controller 207 at summation block 201. In control loop A, a nominal set point pair, (PQ)s, 251, is provided to the summation block 201 of the local DER controller 210 by a high frequency controller HC 209. High frequency controller HC 209 receives from summation block 250 a nominal voltage and frequency set points, (V,F)s, and a feedback data stream 211, (V,F)m, which includes voltage and frequency measurements (e.g., such as phasor measurements from one or more PMUs) from grid 230 (e.g., a micro grid). Energy storage devices ES 203 can be charged or discharged in an effort for the DER to achieve power flow output substantially equivalent to the nominal set point pair, (PQ)s, provided by output, (PQ)d, 208. The energy storage devices ES 203 can have a measured amount of stored energy, SE, measured, for example, in megawatt hours, MWh. The total stored energy of the local DER can be combined using combiner 204 into the total stored energy, (SE)c, 205 and provided to an area controller 240 for use in control loop C. More specifically, the total stored energy of the local DER controller 210, (SE)c, can be combined with total stored energy levels of other DERs within the mixed BA 100 using combiner 222. Combiner 222 can output a single, combined stored energy data stream. Additionally, the total stored energy, (SE)c, 205 of the local DER controller 210 can be feedback to a summation block 241 for use in control loop B. Control loop B can maintain the real power component, P, and reactive power component, Q, at the summation block 241. The control loop B can be provided a set point value (SE)d 206 from splitter 223 of control loop C. Low frequency controller 207 can compute an adjustment to the nominal set point of the local DER controller 210. The output 208 of low frequency controller 207 can account for changes in the real and reactive power components, (P, Q)d. As high frequency controller 202 operates a frequency level greater than that of low frequency controller 207, control loop A operates at a faster frequency than the operation of control loop B. In some instances, the control algorithms 200 can run at different sampling time intervals according to the dynamic responses of the DERs.

High frequency controller 209 can be used to control voltage and frequency level of the local DER controller 210. High frequency controller 209 can be a "state" controller. The set point of high frequency controller 207 can include a constant voltage set point of approximately 12 kV and a frequency set point of approximately 60 Hz. If the frequency set point is controlled at approximately 60 Hz, the voltage magnitude can depend on other conditions in the grid such as energy storage levels and/or load consumption.

Summation block 201 also receives input from splitter 213 of area controller 240. The output of low frequency controller 214 is provided to splitter 213. Splitter 213 then provides real and reactive power set points, (PQ)d, 213 to summation block 201. The real and reactive power set points, (PQ)d, 213 can represent the power demand requested by the area controller 240 for the local DER controller 210. Summation block 201 combines together nominal set point pair, (PQ)s, 251, output 208 of low frequency controller 207, real and reactive power set points, (PQ)d, 212, from splitter 213, and real and reactive power setpoints, (PQ)m, 255, from grid 230. Error data stream 215 can be generated by summation block 201.

Each DER of mixed BA 100 can have different operational characteristics such as time constants, gains, and/or time delays associated with its generated phasor data stream. Low frequency controller 214 can account for the different dynamics of the closed loop controllers it is controlling (e.g., high frequency controller 202). The different dynamics can be accounted for by splitter 213. Splitter 213, using an internal band-pass filter (not shown), can output real and reactive power commands to the DERs at appropriate intervals which allow the splitter 213 to respond to the new commands (e.g., dispatched power set point pairs) before the next commands (e.g., next dispatched power set point pairs) are dispatched by the high frequency controller (e.g., high frequency controller 202 of FIG. 2). Low frequency controller 214 receives an output of summation 254 from summation block 253. Summation block 253 combines a nominal reference set point pair 252 and a combined feedback data stream 217, (V,F)s. Nominal reference set point pair 252 can include a voltage magnitude set point and a frequency set point (e.g., a voltage magnitude set point of approximately 230 kV and a frequency set point of approximately 60 Hz). The combined feedback data stream 217 can be a combined feedback data stream provided by combiner 218. Combiner 218 can combine voltage and frequency measurements (e.g., from one or more PMUs) from local DER controller 210 along with voltage and frequency measurements of other DERs within mixed BA 100. Each of the input data streams to combiner 218 can be time synchronized with a time stamp accuracy of approximately 1 microsecond. Combiner 218 can take these time synchronized measurements and compute an average value of the measurements to generate a combined feedback data stream 217.

Low frequency controller 219 can be a single input/output proportional-integral-derivative (PID) controller. Low frequency controller 219 can receive the output 262 of summation block 261. Summation block 261 can combine together a pre-determined set point 220, (SE)s, which accounts for resiliency, losses, and/or other metrics of the mixed BA 100 and the total stored energy 221 of the mixed BA 100. The total stored energy 221 can be determined by the combiner 222. As previously described, combiner 222 can receive time synchronized measurements from the one or more DERs or groups of DERs regulated by the local DER controller 210 with energy storage capability (e.g., total stored energy 205). Combiner 222 can compute the summation of the DERs which have energy storage capabilities such as local DER controller 210.

The output from the low frequency controller 219 can be split into one or more data streams by splitter 223. Splitter 223 can include a splitting function such as splitting the data streams proportionally to the energy storage capacity of each storage device (e.g., energy storage devices 203) and the current level of storage of the storage devices. The example splitting function can compensate for storage devices being near its respective lower limit. The output command from splitter 223, for example stored energy set point 206, can adjust the set point of the low frequency controller 207. Low frequency controller 207 can in turn adjust the set point of the high frequency controller 202 as previously described. Splitter 223 can also utilize other splitting functions such as splitting the data streams non-proportionally.

In one example, the total stored energy of a DER (e.g., total stored energy 205) can be determined using an optimization program. The control algorithms 200 as described in FIG. 2 can determine adjustments to the real power, P, set points to keep the energy storage level of DERs between minimum and maximum values. The control algorithms 200 can take into account constraints on the maximum allowable real power flow between DERs. In some variations, phasor data streams representing the energy storage levels of the DERs in the mixed BA 100 can refer to the state of charge (SoC) in percentage or state of energy in kilo watt-hour (kWh) of an energy storage system. In other variations, the energy storage levels of the DERs in the mixed BA 100 may refer to the available fuel (gallons) for a fossil or thermal DER.

The desired energy storage level of the $k^{th}$ DER can be denoted by $E_{k,des}$ and the measured energy storage level of the $k^{th}$ DER can be denoted by $E_k$. In order to keep measured energy storage levels, $E_k$, between a minimum value, $E_{k,min}$, and a maximum value, $E_{k,max}$, in some variations threshold bounds can be expressed by:

$$|E_k - E_{k,des}| < E_{k,threshold} \quad (20)$$

and can be used to compute an adjustment, $P_k$, for the real power flow from the kth DER via a proportional adjustment as expressed by:

$$P_k = K_{E,k}(E_k - E_{k,des}), \quad (21)$$

if the following expression is valid:

$$|E_k - E_{k,des}| \geq E_{k,threshold}, \quad (22)$$

where the proportional adjustment gain, $K_{E,k}$, for the kth DER is chosen such that $$P_k < 0 \quad (23)$$

if $$E_k > E_{k,des} \quad (24)$$

in order to increase the power delivery of the kth DER. Alternatively, the proportional adjustment gain, $K_{E,k}$, for the kth DER can be chosen such that Equation (23) is true if $$E_k < E_{k,des} \quad (25)$$

in order to reduce the power delivery kth DER.

In other variations, an adjustment, $P_k$, for the real power flow from the kth DER can be computed via a proportional adjustment of Equation (21) without the use of threshold bounds and where the proportional adjustment gain, $K_{E,k}$, for the kth DER is chosen such that Equation (23) and Equation (24) are satisfied to increase the power delivery of the kth DER. Alternatively, to reduce the power delivery of the kth DER, Equation (23) and Equation (21) should be satisfied.

Yet in other variations, an adjustment, $P_k$, for the real power flow from the $k^{th}$ DER can be computed via a proportional adjustment expressed by:

$$P_k = K_{E,k}(E_k - E_{k,max}) \quad (26)$$

where the measured energy storage level of the kth DER is directly compared to the maximum possible energy storage level, $E_{k,max}$. The proportional adjustment gain, $K_{E,k}$, for the kth DER can be chosen such that Equation (23) is satisfied provided that the following expression is met:

$$E_k < E_{k,max} \quad (27)$$

in order to reduce the power delivery kth DER.

In some variations the proportional adjustment gain, $K_{E,k}$, for the $k^{th}$ DER can be a fixed number such that satisfying Equation (23) and Equation (24) increases the power delivery of the $k^{th}$ DER. Alternatively, satisfying Equation (23) and Equation (25) can reduce the power generation of the $k^{th}$ DER. In other instances, the linearity of the proportional adjustment expressed by Equation (21) can be used to compute proportional adjustment gain, $K_{E,k}$, for each DER k in a mixed BA 100 by optimization. The optimization can minimize the sum of the power loss, $P_{tot}$, of the power loss, $P_{k,m}$, between the $k^{th}$ DER and the m' DER over the total of n DERs in a mixed BA 100 and can be expressed by:

$$P_{tot} = \Sigma_{k=1,m=1}^{n} P_{k,m} \quad (28)$$

For the computation of the power loss, $P_{k,m}$, due to the impedance between the $k^{th}$ DER and the re DER or between $k^{th}$ DER at $POI_k$ and the re DER at $POI_m$, a similar analysis for power flow through a known impedance, $Z_{k,m}$, given earlier in Equation (14) can be used. The power loss, $P_{k,m}$, when sending power through an impedance expressed by:

$$Z_{k,m} = |Z_{k,m}| e^{j\theta_{k,m}} \quad (29)$$

and connecting the kth DER and the mth DER in a mixed BA 100 can be expressed by:

$$P_{k,m} = \text{Re}\left\{ (\overrightarrow{v_k} - \overrightarrow{v_m}) \frac{(v_k - v_m)^*}{(z_{k,m})^*} \right\} \quad (30)$$

where $\overrightarrow{v_k}$ and $\overrightarrow{v_m}$ denotes the complex voltage phasor given earlier in Equation (3), the operation * denotes the complex conjugate, and Re denotes the real part of a complex variable. With knowledge of the impedance given by Equation (29), connecting the kth DER and the mth DER in a mixed BA 100 can minimize the total power loss, $P_{tot}$, as expressed by:

$$P_{tot} = \sum_{k=1,m=1}^{n} \text{Re}\left\{(\overrightarrow{V_k} - \overrightarrow{V_m})\frac{(v_k - v_m)^*}{(z_{k,m})^*}\right\} \quad (31)$$

and subject to the equality constraints given by:

$$P_k = K_{E,k}(E_k - E_{k,des}) \quad (32)$$

for power flow adjustment and subject to the inequality constraints given by:

$$P_{k,m} < P_{k,m}^{max}. \quad (33)$$

To limit the maximum power loss over the impedance between the kth DER and the mth DER in a mixed BA 100 can be solved by computing the solution to a Quadratic Programming (QP) problem.

In some variations, high frequency controller HC 202 can be capable of receiving external commands to the real power set point component, P, reactive power set point component, Q, and stored energy set points from the area controller 240. The real power set point and reactive power set point commands from the area controller 240 can be sent with suitable telecommunications. Additionally, high frequency controller 202 can allow for dispatch orders to be received by the local DERs in time intervals such as one second or much faster. Slower control dispatch can be acceptable for DERs with a slow dynamic response.

Figure 3:
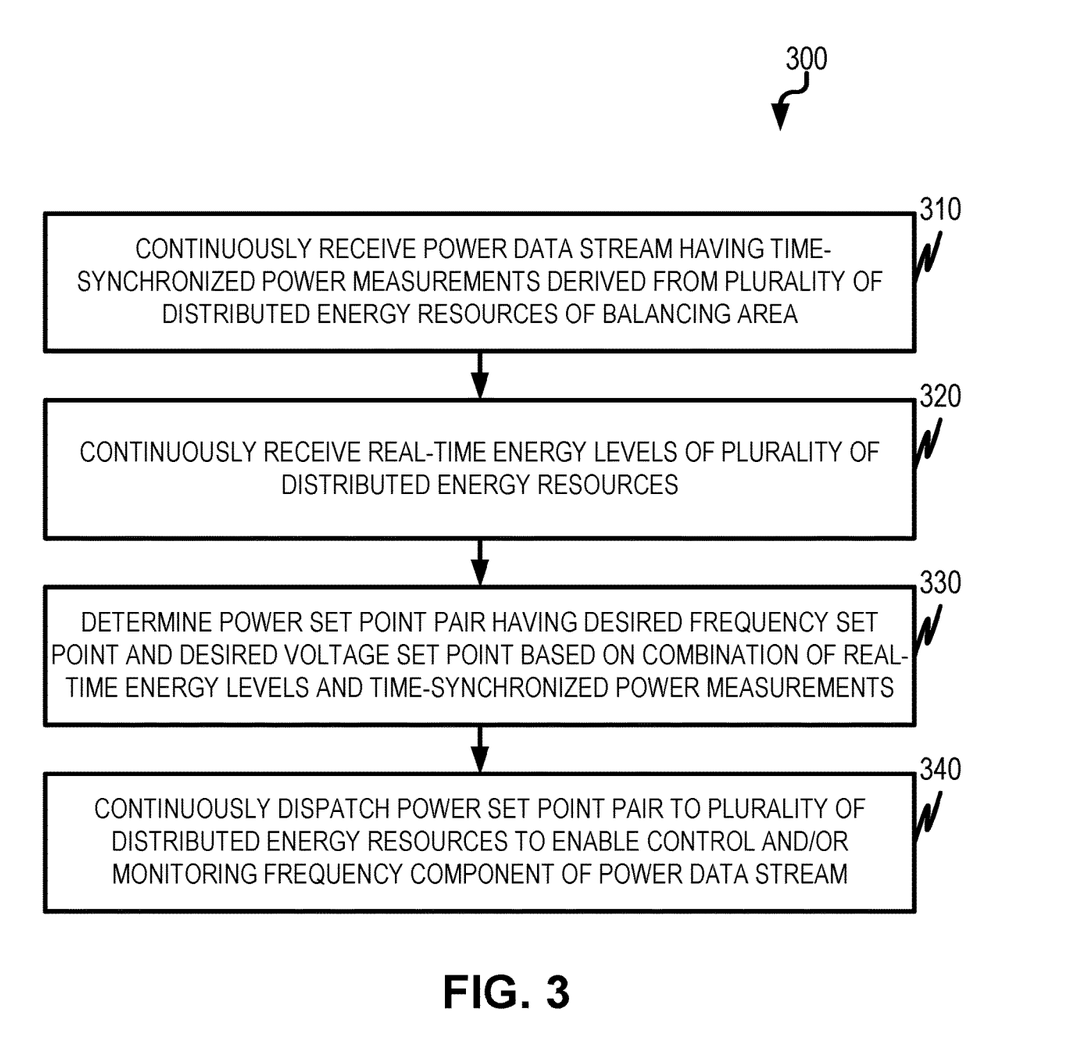
FIG. 3 is a process flow diagram illustrating a method of controlling power of a balancing area of a power system.

FIG. 3 is a process flow diagram 300 illustrating a method of controlling power of a balancing area of a power system. A balancing area of a power system can have a plurality of distributed energy resources as previously described in FIG. 1. A high frequency controller having a memory and at least one data processor of one distributed energy resource of the balancing area can continuously receive, at 310, data comprising a phasor data stream having time-synchronized power measurements derived from the plurality of distributed energy resources of the balancing area. The high frequency controller also continuously receives, at 320, real-time energy levels of the plurality of distributed energy resources. A power set point pair is continuously determined by the high frequency controller, at 330. The power set point pair can be modified based on renewable energy predictions such as forecasted wind or solar generation output. The power set point pair includes a desired frequency set point and a desired voltage set point based on a combination of the real-time energy levels and the time-synchronized power measurements. The power set point pair is continuously dispatched, at 340, by the high frequency controller to the plurality of distributed energy resources to enable control and/or monitoring of a frequency component of the phasor data stream.

Figure 4:
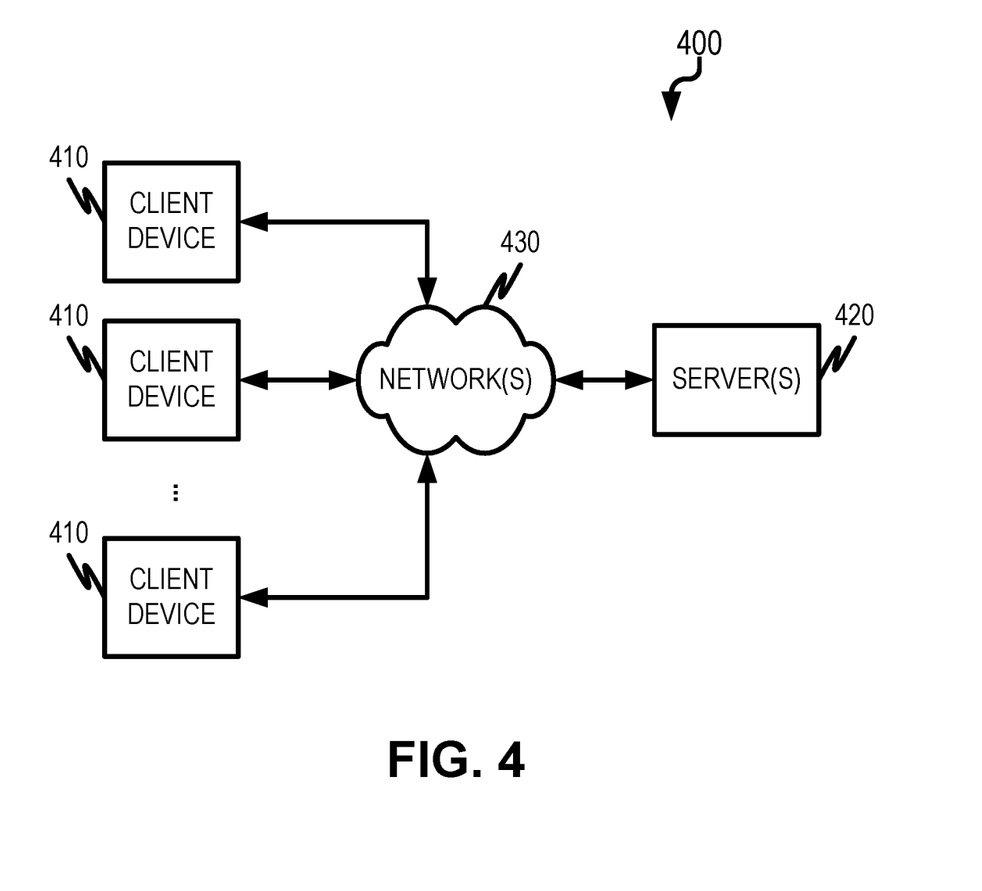
FIG. 4 is a system block diagram illustrating an architecture for use in connection with the current subject matter.

FIG. 4 is a system block diagram illustrating an architecture 400 for use in connection with the current subject matter. The current subject matter is described in connection with an arrangement involving one or more client devices 410 and one or more servers 420 which can communicate over one or more networks 430. Each of the one or more client devices 410 and the one or more servers 420 comprise one or more programmable data processors and memory for storing instructions for executed by such data processor(s). Furthermore, it will be appreciated that each of the client devices 410 or servers 420 can comprise more than one computing device depending on the desired configuration and that the illustration in FIG. 4 is simplified to aid in the understanding of the current subject matter.

The functional blocks described herein can be implemented in commercial computing platforms such as advanced Programmable Logic Controllers (PLCs) or in industrial grade PCs such as the Schweitzer Engineering Laboratories (SEL) 3355 Industrial Personal Computer (PC) that runs multiple tasks, one of which is the controller. The controller processing functionality can be written in any computer language, but one implementation is using C++ running on Windows or Linux operating systems. The output commands from the controller may use standard control protocols such as IEC 61850 Goose or Modbus over Ethernet. In order to maintain high security, fiber optic connections can be used between the controller platform and the providers and/or consumers of the power grid.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 5:
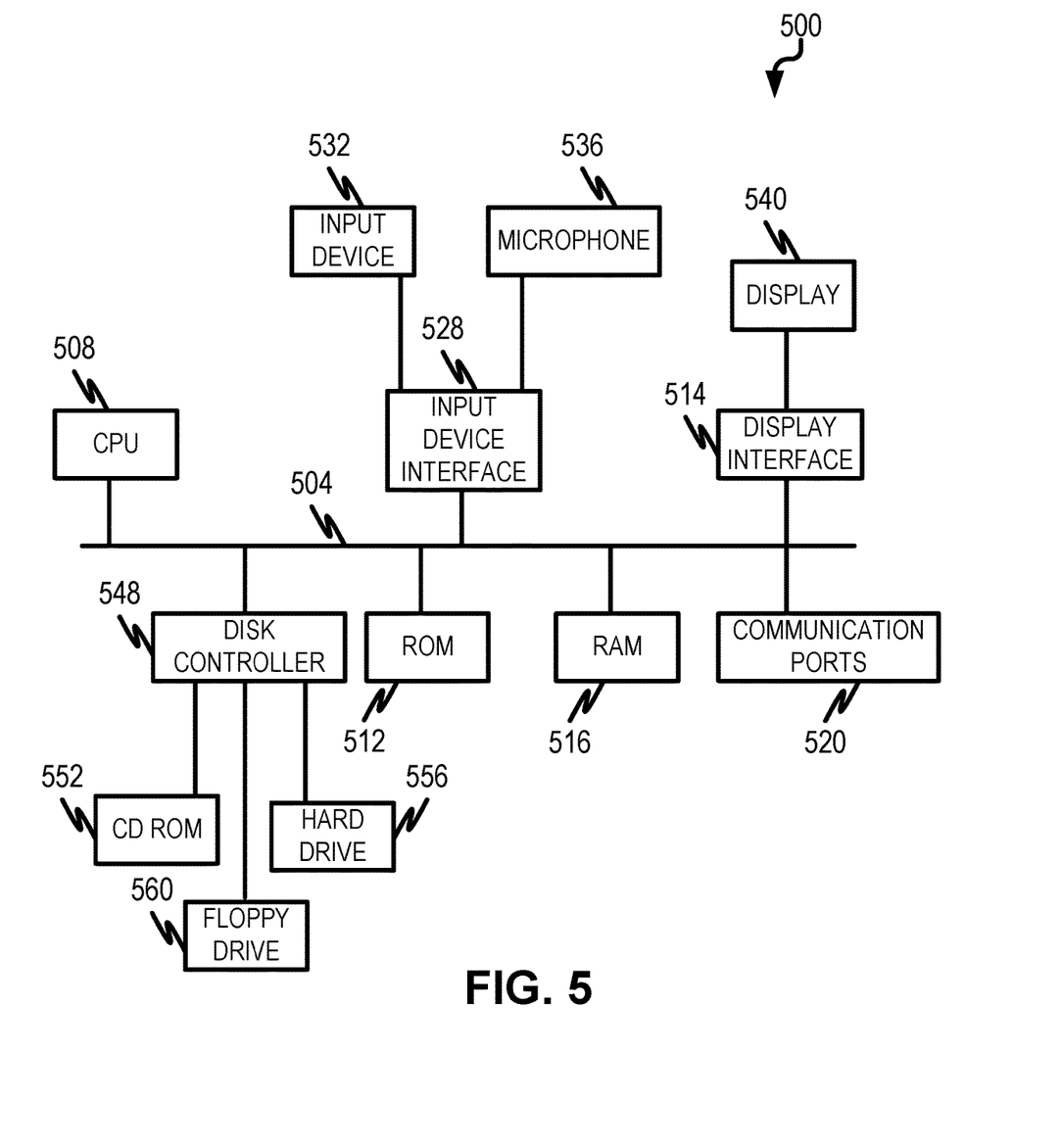
FIG. 5 is a diagram illustrating a sample computing device architecture for implementing various aspects described herein.

FIG. 5 is a diagram illustrating a sample computing device architecture 500 for implementing various aspects described herein. A system bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the communication port 520 includes or otherwise comprises a network interface.

To provide for interaction with a user, the subject matter described herein can be implemented on a computing device having a display 540 (e.g., a CRT (cathode ray tube) or LCD (liquid crystal display) monitor) for displaying information obtained from the system bus 504 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. The input device 532 and the microphone 536 can be coupled to and convey information via the system bus 504 by way of an input device interface 528. Other computing devices, such as dedicated servers, can omit one or more of the display 540 and display interface 514, the input device 532, the microphone 536, and input device interface 528.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an un-recited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for controlling power of a balancing area having a plurality of distributed energy resources of a power system, the method comprising:
continuously receiving, by a high frequency controller having a memory and at least one data processor of one distributed energy resource of the balancing area, data comprising a phasor data stream having time-synchronized phasor measurements derived from the plurality of distributed energy resources of the balancing area;
continuously receiving, by the high frequency controller, real-time energy levels of the plurality of distributed energy resources;
determining, by the high frequency controller, a power set point pair having a desired frequency set point and a desired voltage set point based on a combination of the real-time energy levels and the time-synchronized phasor measurements; and
continuously dispatching, by the high frequency controller, the power set point pair to the plurality of distributed energy resources to enable control and/or monitoring of a frequency component of the phasor data stream.

2. The method of claim 1, further comprising maintaining a power phasor output of at least one of the plurality of distributed energy resources based on the dispatched power set point pair.

3. The method of claim 2, wherein the phasor output has a constant frequency approximately equal to a nominal frequency set point of the at least one distributed energy resource.

4. The method of claim 2, wherein the phasor output has a constant voltage magnitude equal to a nominal magnitude set point of the at least one distributed energy resource.

5. The method of claim 2, wherein the phasor output has a constant voltage angle.

6. The method of claim 5, further comprising determining a sign of the constant voltage angle based on the real-time energy levels and real-time storage capabilities of at least one energy storage device of the distributed energy resource.

7. The method of claim 2, further comprising dampening periodic disturbances in a frequency of the phasor output or a voltage angle of the phasor output.

8. The method of claim 1, wherein plurality of distributed energy resources includes at least one of a photovoltaic cell, a battery, a fuel cell, a wind turbine, a combined cycle gas turbine, a sterling engine, an energy storage system, or a generator.

9. The method of claim 1, wherein the phasor data stream is continuously received from at least one phasor measurement unit (PMU).

10. The method of claim 1, wherein the phasor data stream is continuously received from an instrument capable of sampling and/or supplying at least one phasor measurement.

11. The method of claim 1, wherein the desired frequency set point is defined by $f(kT_s)=D(q)\beta(kT_s)$, wherein $f(kT_s)$ is a filtered derivative of discrete-time samples, $\beta$ is a voltage angle, $T_s$ is a discrete-time sampling time, q is a time shift operator, $D(q)$ is a discrete time filter, and k is a number of discrete samples.

12. A system for controlling power of a balancing area having a plurality of distributed energy resources of a power system, the system comprising:
 a high frequency controller having a memory and at least one data processor of one distributed energy resource of the balancing area; and
 memory storing instructions which when executed by at least one data processor result in operations comprising:
  continuously receiving data comprising a phasor data stream having time-synchronized phasor measurements derived from the plurality of distributed energy resources of the balancing area;
  continuously receiving real-time energy levels of the plurality of distributed energy resources;
  determining a power set point pair having a desired frequency set point and a desired voltage set point based on a combination of the real-time energy levels and the time-synchronized phasor measurements; and
  continuously dispatching the power set point pair to the plurality of distributed energy resources to enable control and/or monitoring of a frequency component of the phasor data stream.

13. The system of claim 12, wherein the operations further comprise maintaining a phasor output of at least one of the plurality of distributed energy resources based on the dispatched power set point pair.

14. The system of claim 13, wherein the phasor output has a constant frequency approximately equal to a nominal frequency set point of the at least one distributed energy resource.

15. The system of claim 13, wherein the phasor output has a constant voltage magnitude equal to a nominal magnitude set point of the at least one distributed energy resource.

16. The system of claim 13, wherein the phasor output has a constant voltage angle.

17. The system of claim 16, wherein the operations further comprise determining a sign of the constant voltage angle based on the real-time energy levels and real-time storage capabilities of at least one energy storage device of the distributed energy resource.

18. The system of claim 13, wherein the operations further comprise dampening periodic disturbances in a frequency of the phasor output or a voltage angle of the phasor output.

19. The system of claim 12, wherein plurality of distributed energy resources includes at least one of a photovoltaic cell, a battery, a fuel cell, a wind turbine, a combined cycle gas turbine, a sterling engine, an energy storage system, or a generator.

20. The system of claim 12, wherein the phasor data stream is continuously received from at least one phasor measurement unit (PMU).

21. The system of claim 12, wherein the phasor data stream is continuously received from an instrument capable of sampling and/or supplying at least one phasor measurement.

22. The system of claim 12, wherein the desired frequency set point is defined by $f(kT_s)=D(q)\beta(kT_s)$, wherein $f(kT_s)$ is a filtered derivative of discrete-time samples, $\beta$ is a voltage angle, $T_s$ is a discrete-time sampling time, q is a time shift operator, $D(q)$ is a discrete time filter, and k is a number of discrete samples.

23. A non-transitory computer program product comprising a computer-readable storage medium having computer-readable program instructions, which when executed result in operations comprising:
 continuously receiving data comprising a phasor data stream having time-synchronized phasor measurements derived from the plurality of distributed energy resources of the balancing area;
 continuously receiving real-time energy levels of the plurality of distributed energy resources;
 determining a power set point pair having a desired frequency set point and a desired voltage set point based on a combination of the real-time energy levels and the time-synchronized phasor measurements; and
 continuously dispatching the power set point pair to the plurality of distributed energy resources to enable control and/or monitoring of a frequency component of the phasor data stream.

* * * * *